United States Patent
Li et al.

(10) Patent No.: US 10,906,241 B2
(45) Date of Patent: Feb. 2, 2021

(54) BIOPRINTER SPRAY HEAD ASSEMBLY AND BIOPRINTER

(71) Applicant: REVOTEK CO., LTD, Sichuan (CN)

(72) Inventors: Yijun Li, Chengdu (CN); Deming Wang, Chengdu (CN); Leqing Zhang, Chengdu (CN); Xuemin Wen, Chengdu (CN)

(73) Assignee: Revotek Co., Ltd, Sichuan (CN)

( * ) Notice: Subject to any disclaimer, the term of this patent is extended or adjusted under 35 U.S.C. 154(b) by 288 days.

(21) Appl. No.: 16/067,461

(22) PCT Filed: Dec. 30, 2015

(86) PCT No.: PCT/CN2015/099816
§ 371 (c)(1),
(2) Date: Jun. 29, 2018

(87) PCT Pub. No.: WO2017/113163
PCT Pub. Date: Jul. 6, 2017

(65) Prior Publication Data
US 2019/0009466 A1 Jan. 10, 2019

(51) Int. Cl.
*B29C 64/209* (2017.01)
*B33Y 30/00* (2015.01)
(Continued)

(52) U.S. Cl.
CPC .......... *B29C 64/209* (2017.08); *B29C 48/255* (2019.02); *B29C 48/304* (2019.02);
(Continued)

(58) Field of Classification Search
CPC .................................................. B29C 48/255
See application file for complete search history.

(56) References Cited

FOREIGN PATENT DOCUMENTS

| CN | 101107167 | 1/2008 |
|----|-----------|--------|
| CN | 103692653 | 4/2014 |

(Continued)

OTHER PUBLICATIONS

International Search Report and Written Opinion for PCT/CN2015/099816, dated Oct. 13, 2016.
(Continued)

*Primary Examiner* — Joseph A Miller, Jr.
(74) *Attorney, Agent, or Firm* — Wolf, Greenfield & Sacks, P.C.

(57) ABSTRACT

The present disclosure relates to a bioprinter spray head assembly, comprising a mounting block having a passage and a spray head mounted in the passage, wherein a first flow channel is provided in the mounting block, one end of the first flow channel is provided with a port communicating with the passage; the spray head comprises an equal diameter portion away from an outlet of the passage and a reduced diameter portion close to the outlet of the passage, wherein a second flow channel is formed between the reduced diameter portion and the passage, an opening is formed between the reduced diameter portion and the port to communicate the first flow channel and the second flow channel, and the equal diameter portion is configured to occlude the port. The adjustment of the circulation area of the spray head assembly may be achieved by changing the relative positions of the reduced diameter portion and the port, so that the adjustment is convenient and easy to carry out, and there is a favorable implementability.

8 Claims, 2 Drawing Sheets

(51) Int. Cl.
    *B29C 48/49*         (2019.01)
    *B29C 48/255*      (2019.01)
    *B29C 64/112*      (2017.01)
    *B29C 48/30*       (2019.01)
    *B29C 67/24*       (2006.01)
    *B05B 1/30*        (2006.01)
    *B05B 7/12*        (2006.01)

(52) U.S. Cl.
    CPC ............ *B29C 48/49* (2019.02); *B29C 64/112* (2017.08); *B29C 67/24* (2013.01); *B33Y 30/00* (2014.12); *B05B 1/3026* (2013.01); *B05B 1/3066* (2013.01); *B05B 7/12* (2013.01)

(56) References Cited

FOREIGN PATENT DOCUMENTS

| | | |
|---|---|---|
| CN | 103878979 | 6/2014 |
| CN | 103911678 | 7/2014 |
| CN | 104085111 | 10/2014 |
| CN | 204020007 | 12/2014 |
| CN | 104260349 | 1/2015 |
| CN | 104582971 | 4/2015 |
| CN | 204354448 | 5/2015 |
| CN | 204354488 | 5/2015 |
| CN | 105167879 | 12/2015 |
| CN | 204839829 | * 12/2015 |
| CN | 105670917 | 6/2016 |
| CN | 205275617 | 6/2016 |
| EP | 1 867 396 A1 | 12/2007 |
| JP | 1999-226456 A | 8/1999 |
| JP | 2016-513979 A | 5/2016 |
| WO | WO 2014/197027 A2 | 12/2014 |
| WO | WO 2015/141036 A1 | 9/2015 |
| WO | WO 2015/181077 A1 | 12/2015 |

OTHER PUBLICATIONS

International Preliminary Report on Patentability for PCT/CN2015/099816, dated Jul. 3, 2018.

Japanese Office Action dated Oct. 8, 2019 in connection with JP Application No. 2018-534092.

* cited by examiner

BIOPRINTER SPRAY HEAD ASSEMBLY AND BIOPRINTER

RELATED APPLICATIONS

This application is a national stage filing under 35 U.S.C. § 371 of International Patent Application Serial No. PCT/CN2015/099816, filed Dec. 30, 2015, the content of which is incorporated herein by reference in its entirety.

TECHNICAL FIELD

The present disclosure relates to the field of bioprinting, and especially relates to a bioprinter spray head assembly and a bioprinter.

BACKGROUND ART 3D bioprinting refers to the printing of biological materials (including natural biological materials and synthetic biological materials or cellular solutions) into a designed three-dimensional structure through the principles and methods of 3D printing. Differing from those printed by ordinary 3D printing technology, the biological tissues or organs produced by 3D bioprinting technology have certain biological functions and need to provide conditions for the further growth of cells and tissues. Exactly due to the aforementioned characteristics, the 3D bioprinting technology is confronted with many specific technical problems in development.

In the field of 3D bioprinting, the print technique of taking cells as a printing material is referred to as cell three-dimensional printing technology. People may utilize cells and biocompatible materials to make bio-ink. The spray head moves and sprays the bio-ink, and the movement of the spray head is controlled by a program to print the bio-ink. The bio-ink is printed and molded according to a three-dimensionally constructed digital model of a preset target print object.

The disadvantages of the prior art lie in that the circulation area of the existing spray head for spraying biological printing material is constant. If the flow rate of the biological printing material fluid needs to be adjusted, it can only be adjusted by depending on the extrusion device at the front end.

CONTENT OF THE DISCLOSURE

In order to overcome the above technical defects, the technical problem solved by the present disclosure is to provide a bioprinter spray head assembly and a bioprinter, wherein the circulation area of the spray head assembly is adjustable, so that the flow rate of the biological printing material sprayed by the bioprinter is adjustable.

In order to solve the aforementioned technical problem, the present disclosure provides a bioprinter spray head assembly, comprising a mounting block having a passage and a spray head mounted in the passage, wherein a first flow channel is provided in the mounting block, one end of the first flow channel is provided with a port communicating with the passage; the spray head comprises an equal diameter portion away from an outlet of the passage and a reduced diameter portion close to the outlet of the passage, wherein a second flow channel is formed between the reduced diameter portion and the passage, an opening is formed between the reduced diameter portion and the port to communicate the first flow channel and the second flow channel, and the equal diameter portion is configured to occlude the port.

In this technical solution, by providing a port communicating with the passage at one end of the first flow channel, and designing the spray head in a structural form composed of an equal diameter portion and a reduced diameter portion, the circulation area in the spray head assembly may be adjusted by changing the relative positions of the reduced diameter portion and the port, such as to adjust the flow rate of the bioprinting material fluid. Such adjustment is convenient and easy to use.

Preferably, there further comprises a spray head groups including a plurality of alternative spray heads, wherein, each of the plurality of alternative sprayer heads is provided with corresponding equal diameter portion and reduced diameter portion having lengths different from the same of other alternative sprayer heads, and the spray head is selected from the plurality of alternative spray heads to achieve one of the following states:

a fully occluded state: in the fully occluded state, the equal diameter portion completely occludes the port;

a partially occluded state: in the partially occluded state, the equal diameter portion partially occludes the port;

a fully open state: in the fully open state, the port fully faces the reduced diameter portion.

In the preferred technical solution, by replacing the spray head having an equal diameter portion and a reduced diameter portion of different lengths, with different position relations between the reduced diameter portion and the port of different spray heads, it is possible to realize one of the fully occluded state, the partially occluded state and the fully open state, so as to further effectuate adjusting a circulation area of the spray head assembly.

Preferably, the spray head is movable in the passage, for adjusting a position of the reduced diameter portion relative to the port of the first flow channel to achieve one of the following states:

a fully occluded state: in the fully occluded state, the equal diameter portion completely occludes the port;

a partially occluded state: in the partially occluded state, the equal diameter portion partially occludes the port;

a fully open state: in the fully open state, the port fully faces the reduced diameter portion.

In the improved technical solution, the spray head is designed into a movable structure in the passage, in which the positional relation between the spray head and the passage varies, so as to change the positional relation between the reduced diameter portion of the spray head and the port, so that a shift among the fully occluded state, the partially occluded state and the fully open state may be realized. Successively, it is realized that the circulation area of the spray head assembly is dynamically adjustable, so as to effectuate that the flow rate of the bioprinting material fluid is dynamically adjustable.

Further, the spray head is extensible in the passage.

In the improved technical solution, the spray head is further designed into a extensible structure in the passage, in which the extensible length of the spray head in the passage varies, so as to change the positional relation between the reduced diameter portion of the spray head and the port, so that a shift among the fully occluded state, the partially occluded state and the fully open state may be realized, to realize that the circulation area of the spray head assembly is dynamically adjustable, so as to effectuate that the flow rate of the bioprinting material fluid is dynamically adjustable.

Further, the spray head is translatable.

In the improved technical solution, the spray head is further designed into a translatable structure in the passage, in which the translation of the spray head in the passage varies, so as to change the positional relation between the reduced diameter portion of the spray head and the port, so that a shift among the fully occluded state, the partially occluded state and the fully open state may be realized, to realize that the circulation area of the spray head assembly is dynamically adjustable, so as to effectuate that the flow rate of the bioprinting material fluid is dynamically adjustable.

Further, the reduced diameter portion is tapered toward an outlet of the spray head.

In the improved technical solution, the reduced diameter portion is designed to be tapered towards the outlet, which facilitates guiding the second material after entering the second flow channel, so that the second material is more easily wrapped on the first material flowing out of the third flow channel.

Further, the reduced diameter section has a conical section taken along a direction towards the outlet of the spray head.

In the improved technical solution, the reduced diameter portion is further designed into a conical structural form so that the distribution of the second material after entering the second flow channel is more uniform, and successively the second material is more uniformly wrapped on the first material flowing out of the third flow channel, and moreover, the conical shape is easy to process.

Further, the spray head comprising a third flow channel which is configured to communicate with the outlet of the spray head.

In the improved technical solution, a third flow channel is provided in the spray head so that the third flow channel together with the second flow channel form two flow channels at the outlet of the spray head, which may supply two types of bioprinting material fluids to the spray head, so as to form a mixed bioprinting unit.

Further, the passage comprises an equal diameter section and a transition section, wherein the equal diameter section communicates with the outlet of the passage through the transition section, the equal diameter portion is disposed within the equal diameter section, the transition section is tapered towards the outlet of the passage, and a chamber is formed between the outlet of the spray head and the outlet of the passage, such that a second material passing through the second flow channel wraps in the chamber a first material sprayed from the outlet of the spray head to form a fluid printing unit.

In the improved technical solution, the second material passes through the second flow channel to enter the chamber and wraps the first material sprayed from the spray head, so as to form a fluid printing unit. The fluid printing unit which flows within the tapered transition section, facilitates converging the fluid, ensures a more stable flow direction of the fluid printing unit formed by wrapping the first material with the second material within the chamber, and avoids its diffusion in the second flow channel.

Further, the second flow channel is tapered from the transition section to the outlet of the spray head.

In the improved technical solution, the second flow channel is tapered from the transition section to the outlet of the spray head, which facilitates the convergence of the second material to the outlet of the spray head in the second flow channel, and avoids that the second material wraps the first material in an excessive thickness.

The present disclosure further provides a bioprinter, which comprises the aforementioned bioprinter spray head assembly. Preferably, the bioprinter is a 3D bioprinter.

In the technical solution, the bioprinter comprising the aforementioned bioprinter spray head assembly also presents the aforementioned advantageous technical effect.

On the basis of the aforementioned technical solution, the present disclosure provides a bioprinter spray head assembly, which is configured such that, by providing a port communicating with the passage at one end of the first flow channel, and designing the spray head in a structural form composed of an equal diameter portion and a reduced diameter portion, the circulation area of the spray head assembly may be adjusted by changing the relative positions of the reduced diameter portion and the port, such as to adjust the flow rate of the bioprinting material fluid sprayed by the spray head. Such adjustment is convenient and easy to carry out, and there is a favorable implementability.

BRIEF DESCRIPTION OF THE DRAWINGS

The drawings described herein are used to provide a further understanding of the present disclosure and constitute a part of the present application. The illustrative embodiments of the present disclosure as well as the descriptions thereof, which are merely used for explaining the present disclosure, do not constitute improper definitions on the present disclosure. In the drawings.

EMBODIMENTS

Next, the technical solution of the present disclosure is further described in detail by means of the drawings and embodiments.

The specific embodiments of the present disclosure are further described in order to facilitate understanding of the concept of the present disclosure, the technical problem to be solved, the technical features constituting the technical solution and the technical effect produced therefrom. It is necessary to explain that, the explanations for such embodiments do not constitute definitions on the present disclosure. In addition, the technical features involved in the embodiments of the present disclosure described below may be combined with each other as long as they do not constitute a conflict therebetween.

Considering a fixed circulation area of the bioprinting material feeding tube of the existing bioprinter spray head assembly, if the flow rate needs to be adjusted, it can only be adjusted by depending on the extrusion device at the front end. The present disclosure designs a bioprinter spray head assembly, which is configured such that, by providing a port communicating with the passage at one end of the first flow channel, and designing the spray head in a structural form composed of an equal diameter portion and a reduced diameter portion, the adjustment of the circulation area of the spray head assembly may be realized by changing the relative positions of the reduced diameter portion and the port, such as to effectuate adjusting the flow rate of the bioprinting material fluid at the outlet end of the printer. Such adjustment is convenient and easy to carry out, and there is a favorable implementability.

Figure 1:
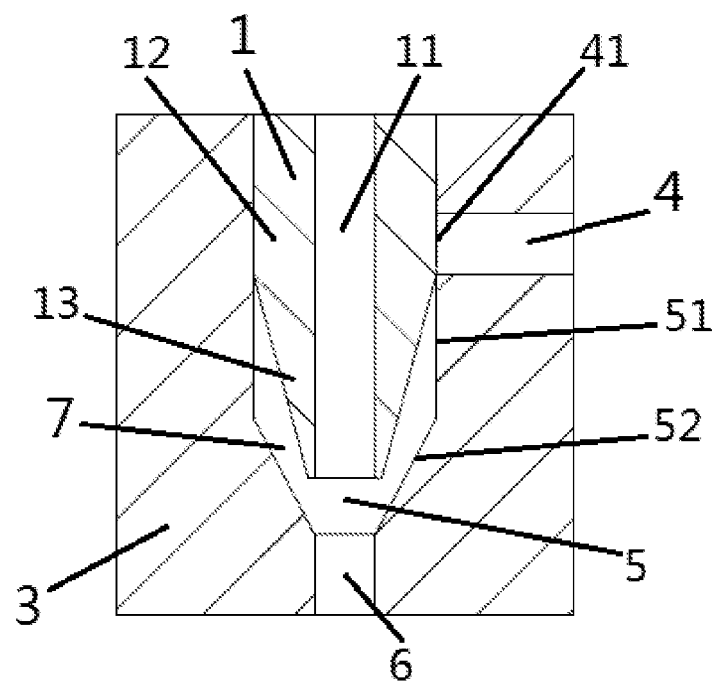
FIG. 1 is a schematic view of the structure of the bioprinter spray head assembly of the present disclosure in the fully occluded state.
Figure 2:
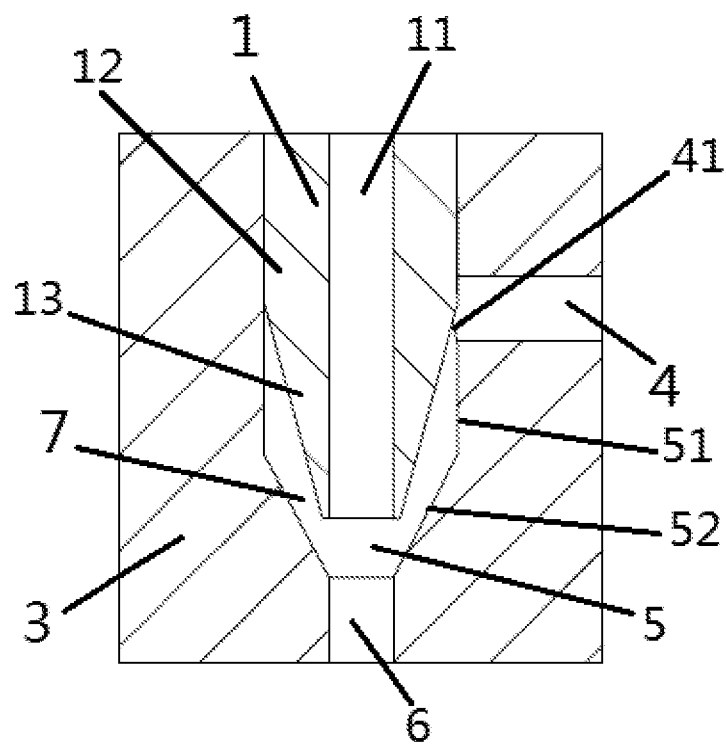
FIG. 2 is a schematic view of the structure of the bioprinter spray head assembly of the present disclosure in the partially occluded state.
Figure 3:
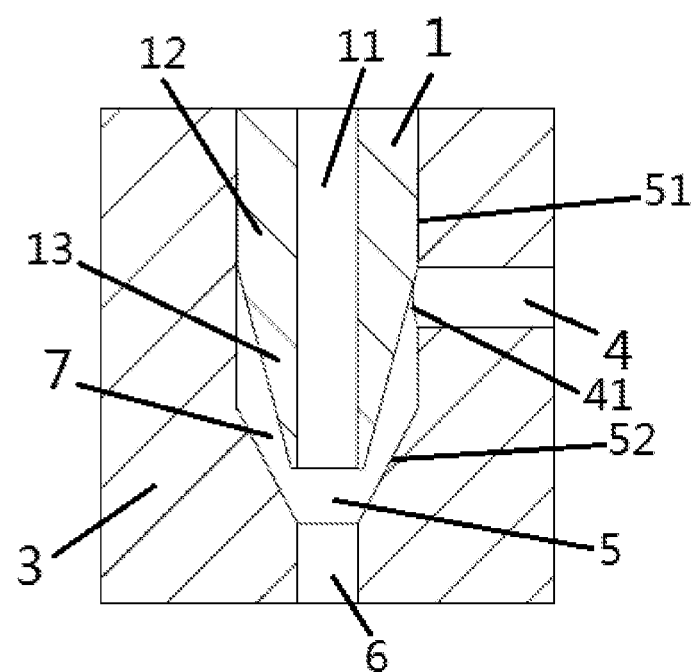
FIG. 3 is a schematic view of the structure of the bioprinter spray head assembly of the present disclosure in the fully open state.

In one illustrative embodiment of the bioprinter spray head assembly of the present disclosure, as shown in FIGS. 1 to 3, the bioprinter spray head assembly comprises a mounting block 3 having a passage 5 and a spray head 1 mounted in the passage 5, wherein a first flow channel 4 is provided in the mounting block 3, one end of the first flow channel 4 is provided with a port 41 communicating with the passage 5; the spray head 1 comprises an equal diameter portion 12 away from an outlet 6 of the passage 5 and a reduced diameter portion 13 close to the outlet 6 of the passage 5. The biological material supply source is used to supply the bioprinting material fluid to the first flow channel 4.

Optionally, the spray head 1 comprising a third flow channel 11 which is configured to communicate with the outlet of the spray head 1 and supply the bioprinting material fluid to the outlet of the spray head 1. The first flow channel 4 and the third flow channel 11 may supply a single category of bioprinting material fluid, and may also be used to respectively supply different categories of bioprinting material fluids, such as a first material and a second material. For example, the third flow channel 11 is used to supply the first material, and the first flow channel 4 is used to supply the second material wrapping the first material.

Among them, regarding the first material and the second material, one preferred embodiment is that, the first material is a printing material containing cells (for example bio-ink), and the second material is a printing material that does not contain cells. In this embodiment, more preferably, the second material is a material with temperature-sensitive properties, especially a biocompatible material with temperature-sensitive properties and certain viscosity (for example hydrogel). Certainly, as another embodiment, the first material is a printing material that does not contain cells, while the second material is a printing material that contains cells. In the remaining embodiments, the first material and the second material may also be printing materials that both contain cells, or may also be printing materials that do not contain cells.

Regarding the morphology of the first material and the second material, either or both of the first material and the second material are one of the following several morphologies: homogeneous, non-homogeneous (e.g., granular mixture), continuous or discontinuous fluid.

The bioprinter spray head assembly may comprise a first material supply source for supplying the first material to the third flow channel 11, and a second material supply source for supplying the second material to the first flow channel 4.

As shown in FIG. 1, the equal diameter portion 12 is configured to be used to occlude the port 41 of the first flow channel 4. The radial dimension of the reduced diameter portion 13 may be smaller than the equal diameter portion 12, and a second flow channel 7 is formed between the reduced diameter portion 13 and the passage 5. As shown in FIGS. 2 and 3, the opening between the port 41 and the reduced diameter portion 13 serves to communicate the first flow channel 4 and the second flow channel 7.

As described in FIGS. 1-3, the spray head 1 can be in at least one of the following states:

In the fully occluded state, as shown in FIG. 1, the equal diameter portion 12 completely occludes the port 41 of the first flow channel 4 so that the first flow channel 4 and the second flow channel 7 are disconnected in communication;

In the partially occluded state, as shown in FIG. 2, the equal diameter portion 12 partially occludes the port 41 of the first flow channel 4, and the port 41 of the first flow channel 4 partially faces the reduced diameter portion 13 so that the first flow channel 4 communicates with the second flow channel 7 partially;

In the fully open state, as shown in FIG. 3, the port 41 of the first flow channel 4 fully faces the reduced diameter portion 13, so that the first flow channel 4 communicates with the second flow channel 7 completely.

In the illustrative embodiment, a port 41 communicating with the passage 5 is provided at one end of the first flow channel 4, and the spray head 1 is designed to include an equal diameter portion 12 and a reduced diameter portion 13. By changing the relative positions of the reduced diameter portion 13 and the port 41, it is realized that the circulation area of the spray head assembly is adjustable, such as to effectuate that the flow rate of the bioprinting material fluid is adjustable. Such adjustment is convenient and easy to carry out, and there is a favorable implementability.

As shown in FIG. 1, the equal diameter portion 12 completely occludes the port 41 of the first flow channel 4 so that the first flow channel 4 and the second flow channel 7 are disconnected in communication, which makes that the circulation area of the first flow channel 4 is zero. The second material cannot enter the second flow channel 7 and the spray head assembly is in the fully occluded state;

As shown in FIG. 2, the equal diameter portion 12 partially occludes the port 41 of the first flow channel 4, and the port 41 of the first flow channel 4 partially faces the reduced diameter portion 13. At this time, the circulation area of the first flow channel 4 may increase as the opening between the port 41 and the reduced diameter portion 14 is enlarged, and the second material within the first flow channel 4 enters the second flow channel 7 through the opening. In this case, the circulation area of the first flow channel 4 is in direct proportion to the size of the opening between the port 41 and the reduced diameter portion 13, such that the flow rate of the biological printing material increases as the opening is enlarged. At this time, the spray head assembly is in the partially occluded state;

As shown in FIG. 3, the port 41 of the first flow channel 4 fully faces the reduced diameter portion 13, and the opening between the port 41 and the reduced diameter portion 13 reaches a maximum. At this time, the circulation area of the first flow channel 4 is maximum, so that the flow rate of the bioprinting material fluid passing through the first flow channel 4 reaches a maximum, and the spray head assembly is in a fully open state.

As a first embodiment of the present disclosure, the bioprinter spray head assembly comprises a spray head groups including a plurality of alternative spray heads, wherein, each of the plurality of alternative sprayer heads are provided with corresponding equal diameter portion 12 and reduced diameter portion 13 having lengths different from the same of other alternative sprayer heads. The spray head 1 is selected from a plurality of alternative spray heads as necessary, so as to realize one of the fully occluded state, the partially occluded state and the fully open state. In other words, by replacing the spray head having an equal diameter portion 12 and a reduced diameter portion 13 of different lengths, the position relation between the reduced diameter portion 12 of the spray head and the port 41, the size of the opening between the port 41 and the reduced diameter portion 13 is further adjusted, to realize one of the fully occluded state, the partially occluded state and the fully open state, so as to effectuate that the flow rate of the printing material is adjustable.

As a second embodiment of the present disclosure, the spray head 1 is movable in the passage 5, such that the positional relation between the spray head 1 and the passage 5 varies, thereby changing the positional relation between the reduced diameter portion 13 of the spray head and the port 41. Further, the size of the opening between the port 41 and the reduced diameter portion 13 is changed, so that a shift among the fully occluded state, the partially occluded state and the fully open state may be realized, so as to effectuate that the flow rate of the second material is dynamically adjustable.

The spray head 1 may be integrally translated in the passage, and may also be partially movable. For example, the equal diameter portion 12 or the reduced diameter portion 13 of the spray head 1 is extensible. The spray head 1 is further designed into a extensible structure in the passage 5, in which the extensible length of the spray head 1 in the passage 5 varies, so as to change the positional relation between the reduced diameter portion 13 of the spray head 1 and the port 41. Further, the size of the opening between the port 41 and the reduced diameter portion 13 is changed, so that a shift among the fully occluded state, the partially occluded state and the fully open state may be realized, such as to effectuate that the flow rate of the second material is dynamically adjustable.

In the first and second embodiments, the reduced diameter portion 13 may be a cylindrical structure in which its radial dimension is smaller than the equal diameter portion 12, and may also be tapered towards the outlet 6. As shown in FIGS. 1-3, the reduced diameter portion 13 is designed to be in a structural form tapered towards the outlet 6, which facilitates guiding the second material after entering the second flow channel 7, so that the second material is more easily wrapped on the first material flowing out of the third flow channel 11. Preferably, the reduced diameter portion 13 has a conical section along a direction towards the outlet 6, so that the distribution of the second material after entering the second flow channel 7 is more uniform, and successively the second material is more uniformly wrapped on the first material flowing out of the third flow channel 11, and moreover, the conical shape is easy to process.

As an improvement to the first and second embodiments, as shown in FIGS. 1-3, the passage 5 comprises an equal diameter section 51 and a transition section 52, wherein the equal diameter section 51 communicates with the outlet 6 through the transition section 52, the equal diameter portion 12 is disposed within the equal diameter section 51, the transition section 52 is tapered towards the outlet 6, a chamber is formed between the outlet of the spray head 1 and the outlet 6, such that a second material passing through the second flow channel wraps in the chamber a first material sprayed from the outlet of the spray head 1 to form a fluid printing unit. The second material passes through the first flow channel to enter the chamber and wraps the first material sprayed from the spray head 1, so as to form a fluid printing unit. The fluid printing unit which flows within the tapered transition section 52, mainly facilitates the convergence, ensures a more stable flow direction of the fluid printing unit by wrapping the first material with the second material within the chamber, and avoids its diffusion in the second flow channel 7.

As shown in FIGS. 1-3, further, the second flow channel 7 is tapered from the transition section 52 to the outlet of the spray head 1. Such structural form which facilitates the convergence and acceleration of the second material, enhances the wrapping tendency of the first material by the second material, and avoids that the second material wraps the first material in an excessive thickness.

The present disclosure further provides a bioprinter, which comprises the aforementioned bioprinter spray head assembly. The bioprinter spray head assembly of the present disclosure is especially suitable for a 3D bioprinter.

The above-combined embodiments make detailed explanations for the embodiments of the present disclosure, but the present disclosure is not limited to the embodiments described. For a person skilled in the art, multiple changes, modifications, equivalent replacements, and variations made to such embodiments still fall within the protection scope of the present disclosure without departing from the principles and substantive spirit of the present disclosure.

What is claimed is:

1. A bioprinter spray head assembly, comprising a mounting block having a passage and a spray head mounted in the passage, wherein a first flow channel is provided in the mounting block, one end of the first flow channel is provided with a port communicating with the passage; the spray head comprises an equal diameter portion away from an outlet of the passage and a reduced diameter portion close to the outlet of the passage, wherein a second flow channel is formed between the reduced diameter portion and the passage, an opening is formed between the reduced diameter portion and the port to communicate the first flow channel and the second flow channel, and the equal diameter portion is configured to occlude the port, the spray head comprises a third flow channel which is configured to communicate with the outlet of the spray head, the bioprinter spray head assembly comprises a spray head groups comprising a plurality of alternative spray heads, wherein, each of the plurality of alternative sprayer heads is provided with corresponding equal diameter portion and reduced diameter portion having lengths different from the same of other alternative sprayer heads, and the spray head is selected from the plurality of alternative spray heads to achieve one of the following states:

a fully occluded state: in the fully occluded state, the equal diameter portion completely occludes the port;

a partially occluded state: in the partially occluded state, the equal diameter portion partially occludes the port;

a fully open state: in the fully open state, the port fully faces the reduced diameter portion; or the spray head is movable in the passage, for adjusting a position of the reduced diameter portion relative to the port of the first flow channel to achieve one of the following states:

a fully occluded state: in the fully occluded state, the equal diameter portion completely occludes the port;

a partially occluded state: in the partially occluded state, the equal diameter portion partially occludes the port;

a fully open state: in the fully open state, the port fully faces the reduced diameter portion.

2. The bioprinter spray head assembly according to claim 1, wherein the spray head is extensible.

3. The bioprinter spray head assembly according to claim 1, wherein the spray head is translatable.

4. The bioprinter spray head assembly according to claim 1, wherein the reduced diameter portion is tapered toward an outlet of the spray head.

5. The bioprinter spray head assembly according to claim 4, wherein the reduced diameter section has a conical section taken along a direction towards the outlet of the spray head.

6. The bioprinter spray head assembly according to claim 1, wherein the passage comprises an equal diameter section and a transition section, wherein the equal diameter section communicates with the outlet of the passage through the transition section, the equal diameter portion is disposed within the equal diameter section, the transition section is tapered towards the outlet of the passage, and a chamber is formed between the outlet of the spray head and the outlet of the passage, such that a second material passing through the second flow channel wraps in the chamber a first material sprayed from the outlet of the spray head to form a fluid printing unit.

7. The bioprinter spray head assembly according to claim 6, wherein the second flow channel is tapered from the transition section to the outlet of the spray head.

8. A bioprinter, comprising the bioprinter spray head assembly according to claim 1.

* * * * *